United States Patent [19]

Brine

[11] Patent Number: 4,542,869
[45] Date of Patent: Sep. 24, 1985

[54] FLAP MECHANISM

[75] Inventor: Gerald T. Brine, La Palma, Calif.

[73] Assignee: McDonnell Douglas Corporation, Long Beach, Calif.

[21] Appl. No.: 507,281

[22] Filed: Jun. 23, 1983

[51] Int. Cl.[4] .............................................. B64C 3/50
[52] U.S. Cl. .................................................... 244/216
[58] Field of Search ............... 244/213, 215, 216, 218, 244/219

[56] References Cited

U.S. PATENT DOCUMENTS

| | | | |
|---|---|---|---|
| 2,608,364 | 8/1952 | Gordon et al. | 244/216 |
| 2,688,455 | 9/1954 | Clark | 244/216 |
| 3,853,289 | 12/1974 | Nevermann et al. | 244/215 |
| 4,172,575 | 10/1979 | Cole | 244/216 |
| 4,381,093 | 4/1983 | Rudolph | 244/216 |

FOREIGN PATENT DOCUMENTS

| | | | |
|---|---|---|---|
| 951122 | 10/1949 | France | 244/216 |
| 650914 | 3/1951 | United Kingdom | 244/216 |

Primary Examiner—Galen L. Barefoot
Attorney, Agent, or Firm—Paul T. Loef; Donald L. Royer; George W. Finch

[57] ABSTRACT

A mechanism for supporting and translating a wing trailing edge flap system. The flap is pivotally supported by a carriage and track at one point and the free ternary link of a four-bar linkage at a second point, to combine and form an overall six-bar linkage system of the Stephenson III type.

6 Claims, 5 Drawing Figures

STEPHENSON III

FLAP MECHANISM

BACKGROUND OF THE INVENTION

The present invention relates to wing trailing edge flaps for aircraft and, more particularly to a structure which supports the flap by two elements, a linkage system and a track connected to the wing, moving the trailing edge flap system between the extended and retracted positions.

The aerodynamic design of modern aircraft wings is a compromise between many conflicting requirements, thus limiting near optimum aerodynamic performance to a small portion of their flight envelope. Obviously, great emphasis must be placed on cruise configuration, as this is the regime most frequently experienced. However, modern wings must be configured to include high lift devices, such as flaps, which are, in affect, extensions of the wing. Flaps are used to enhance lift during takeoff and landing and are retracted when the aircraft is in a cruise configuration. Drag, weight, stress levels, system flexure, and system complexity are all important factors in flap drive systems.

While the flap drive system is, to various degrees, dependent upon and determined by the lofted shape of the flap, the location of the spoiler, the location of the wing fixed trailing edge, the relationship of the flap to the trailing edge gaps and overhangs (gap and overhang may be defined respectively as the aerodynamically described distance between the wing fixed trailing edge and the lofted surface of the flap, and the distance between the trailing edge of one airfoil and the leading edge of another airfoil, e.g., a trailing edge of the wing and the leading edge of the flap), and the aerodynamic requirements dictating flap extension and flap angle at takeoff, landing and cruise are the most critical requirements. Many different approaches to the drive mechanism may be used and have been used in the past.

The simplist system is a simple hinge contained within the wing structure as shown in U.S. Pat. No. 3,594,851, issued to Swatton. A simple pivot flap may be enhanced by a slaved slot door which acts as a vane to direct the boundary layer air as shown in U.S. Pat. No. 2,920,844, to Marshall, et al. In most modern aircraft, simple systems are not satisfactory because the lift enhancement required dictates either a pivot point which is far below the wing surface or requires translation of the flap as well as rotation. In order to translate as well as rotate, a track may be used to support the flap; a linkage driving a flap on a track was taught in U.S. Pat. No. 2,271,763 to Fowler. In this reference, the flap is totally supported by the track. In some cases, the tracks have been attached to the wing with the carriage attached to the flap which rolls on a fixed track as taught in U.S. Pat. No. 1,670,852 to Fowler. Alternately, the track may be attached to the flap as taught in U.S. Pat. No. 3,438,599 to Welzen. In this rather interesting reference, the fixed carriage is attached to the fuselage at the inboard end of the flap and the outboard of the flap is supported by a very long simple hinge.

A two-track arrangement with a screw jack actuator, where the programming track is attached to the flap rather than the wing, is taught in U.S. Pat. No. 2,836,380, issued to Pearson. Two converging tracks are taught in U.S. Pat. No. 2,426,785 to Nauman, while no drive is shown. Another two-track arrangement with a curved track to program the flap is taught in U.S. Pat. No. 2,677,512, issued to Kirkbride, et al. U.S. Pat. No. 2,620,147 to Butler, et al teaches a two-track support with a ball screw drive where one track articulates. The screw translates in the nut. U.S. Pat. No. 2,609,166 to Bellam is another variation of two tracks and a screw jack drive where the two tracks converge and the nut translates on the screw jack.

U.S. Pat. No. 3,853,289 to Nevermann, et al is representative of the class of mechanisms that translates and rotates the flap as in the track systems; however, the support and motion is totally provided by a linkage system and a rotary drive. This linkage system is a textbook six-bar linkage system of the Stephenson I type.

Two-track systems are generally complex and difficult to install and maintain tolerances. Additionally, all of these use a linear-type actuator like a ball screw drive. The six-bar linkage system of U.S. Pat. No. 3,853,289 provides a compact linkage mechanism; however, because of the number of pins in the linkages system, the system flexure is very high. It is difficult to maintain the required rigidity.

In summary, initial flap systems employed simple hinge systems. Aerodynamic requirements then became more complex and dictated flap extension as well as rotation, and the art, generally, went to the two-track system. The nature of these systems is such that the support points, which is a set of wheels on each track, are very close together imposing a large moment load which results in high wheel loads because of the close proximity of the two support points. An all-linkage system separates the support points but has an inherent flexure problem because of the number of links and, particularly, pivot points are subject to wear. It is important to note that many different drive mechanisms can drive the same flap system. The reason for that is, as noted above, it is axiomatic that you cannot meet all of the aerodynamic requirements. The flap cruise position, which is essentially the stowed position, along with the flap position at takeoff and landing, as well as gaps and overhangs in these two latter positions determine the locus of points through which the flap must travel. The points are then picked to support the flap and the locus of these support points is then established by moving the flap along its previously established course. The locus of points and the two support points, then, of course, establish what the mechanism needs to do. The task is to invent a mechanism which best moves the flap through its previously established course at minimum cost and weight.

It is an object of this invention to produce the most efficient kinematic chain with the optimum number of degrees of freedom to best drive the flap through the aerodynamically determined optimum locus of points for cruise, landing, and takeoff positions as well as producing optimum gaps and overhangs at the takeoff and landing positions. Its emphasis is on simplicity and light weight, avoiding the complexities of the two-track system, and the lack of rigidity of the trackless six-bar linkage system.

SUMMARY OF THE PRESENT INVENTION

In summary, the trailing edge flap drive system of this invention accomplishes the above objects and overcomes the disadvantages of the prior devices by providing a trailing edge flap system on which the flap is supported by two elements, a straight track, and a four-bar linkage. A rotary actuator drives the four-bar linkage to provide the driving power to extend and retract the flap. The carriage mounted on the track is pivotally connected to the main flap. The overall kinematic chain, treating the track as a link of infinite length, is a Stephenson type III six-bar mechanism. The drive link of the four-bar linkage is pivotally connected to a rotary actuator and the free ternary link is pivotally connected to the flap support. The four-bar linkage and the track and carrier combine to form a six-bar linkage which extends and rotates the flap segments to an aerodynamically optimum locus of points for its particular wing between the retract and extend positions.

BRIEF DESCRIPTION OF THE DRAWINGS

With reference to the drawings wherein like reference numerals designate like portions of the invention:

FIG. 3 is a side view as shown in FIG. 1 with the flap and mechanism shown in the extended position;

DESCRIPTION OF THE PREFERRED EMBODIMENT

Figure 1:
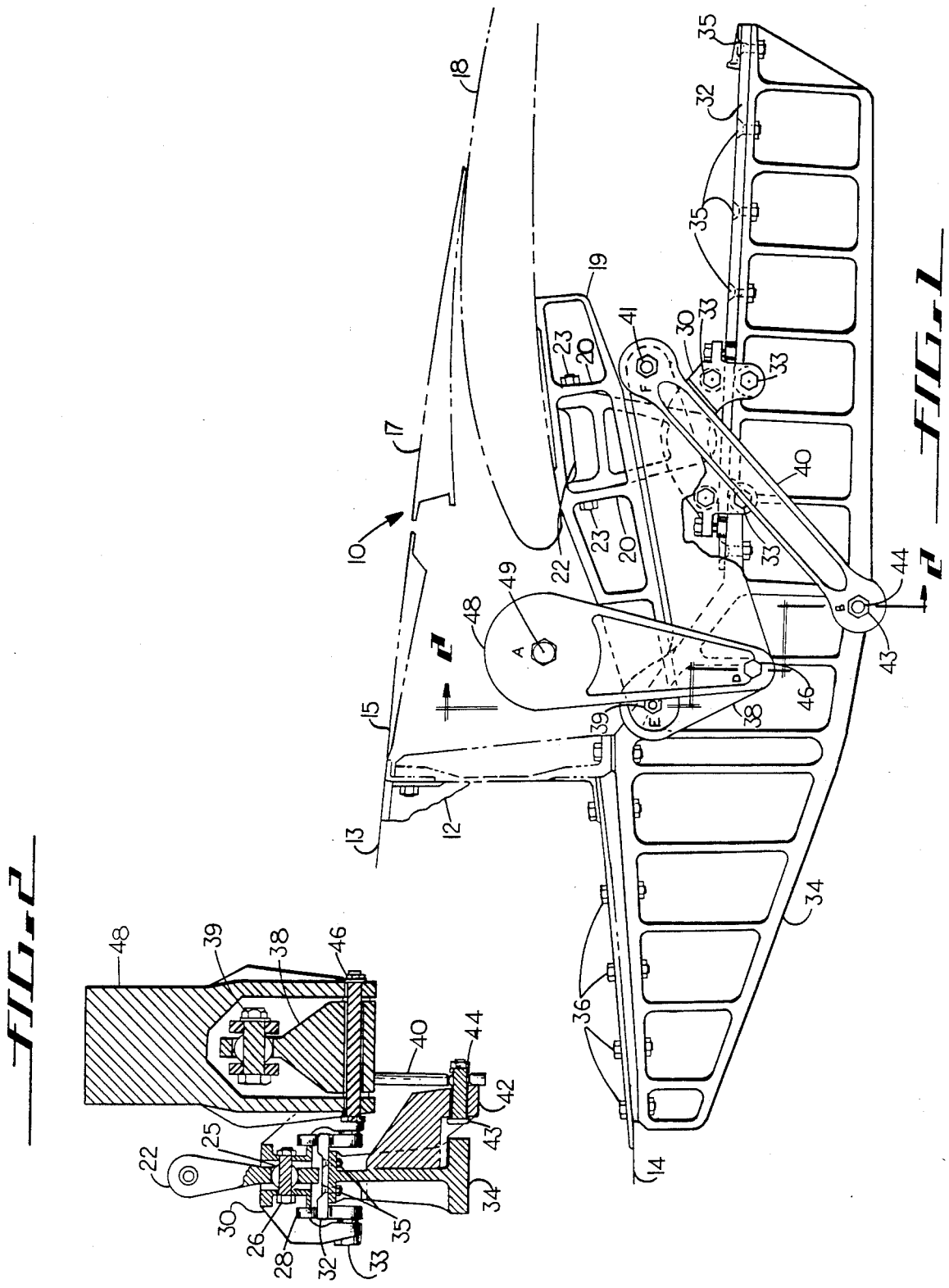
FIG. 1 is a side view of the overall flap system in relationship to the wing trailing edge of the spoiler in a retracted position.

FIG. 1 shows a wing section 10 which, for orientation purposes, includes a spar 12, an upper skin 13, a lower skin 14 and a trailing edge 15. A spoiler is shown at 17 which actuates independently from the flap system; however, the support system and actuating means have been omitted for clarity. The flap 18 is shown in the retracted position.

Figure 2:
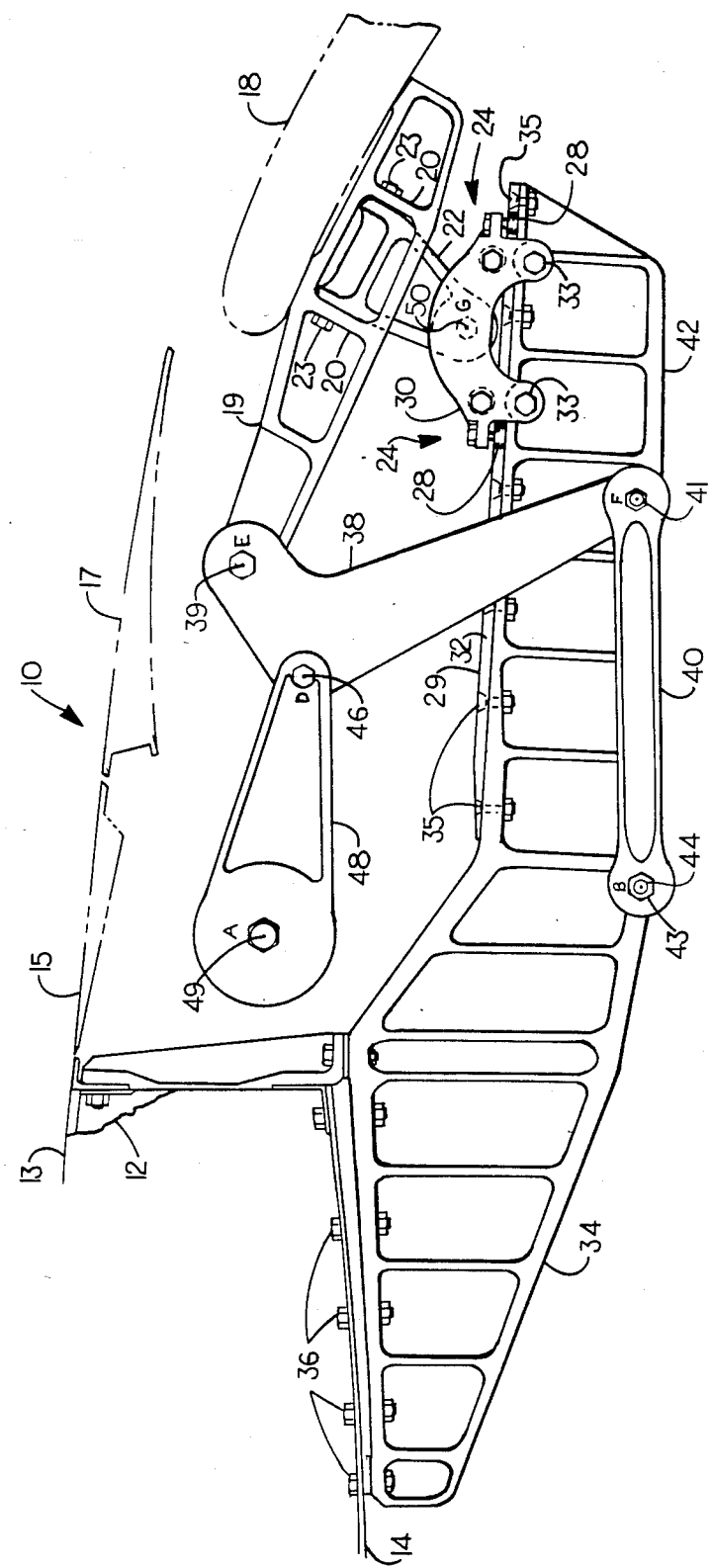
FIG. 2 is a cross section cut at 2—2 of FIG. 1 showing the track mounted carriage and part of the linkage with the rotary actuator removed.

Attached to the bottom of the flap 18 is a support bracket 19 which includes a pair of webs 20. Pivotally supported between the webs 20 is a bracket 22 by the bolt and fastener 23 so as to allow rotation of the bracket 22 about the bolt 23. The other end of the bracket 22 is attached to the carriaged assembly 24 by a spherical bearing 25 as shown in FIG. 2 and is secured by the bolt and fastener 26.

Attached to the carriage housing 30 are 12 cam followers 28 symmetrically arranged about the carriage housing so that eight roller bearing portions of the cam followers 28 engage the upper and lower surfaces of the track 29. The cam followers 28 also engage the track edge 32 so that the carriage is restrained on the track, both up and down and sideways. The cam followers 28 are maintained in place by the nuts 33 and combine with the carriage housing 30 to constitute the carriage assembly 24. The track 29 is attached to the track support structure 34 by the machine head fasteners 35 while the track support structure 34 is attached to the wing structure at the rear spar 12 by the fasteners 36.

The protruding portion of the flap support bracket 19 is pin connected, again with a spherical bearing, to the free ternary link 38 at 39. Incidentally, a portion of the free ternary link 38 has been removed in FIG. 1 to show a portion of the carriage assembly 24. The far end of ternary link 38 is in turn pin connected to the driven link 40 at 41. The other end of the driven link 40 is fixed to the extension portion 42 of the track support 34 by the bolt and fastener 43, again with a spherical bearing so as to be free to rotate about the center 44 but restrained in all other directions. Pin connected at 46 to the mid pin, on the free ternary link 38 is the drive link 48, by the fastener pin 46. The other end of the drive link 48 is attached directly to a rotary actuator or a torque tube which in turn is driven by an actuator (not shown) at 49 so as to rotate the drive link 48 from the retract position as shown in FIG. 1 to the extend position as shown in FIG. 3.

Figure 4:
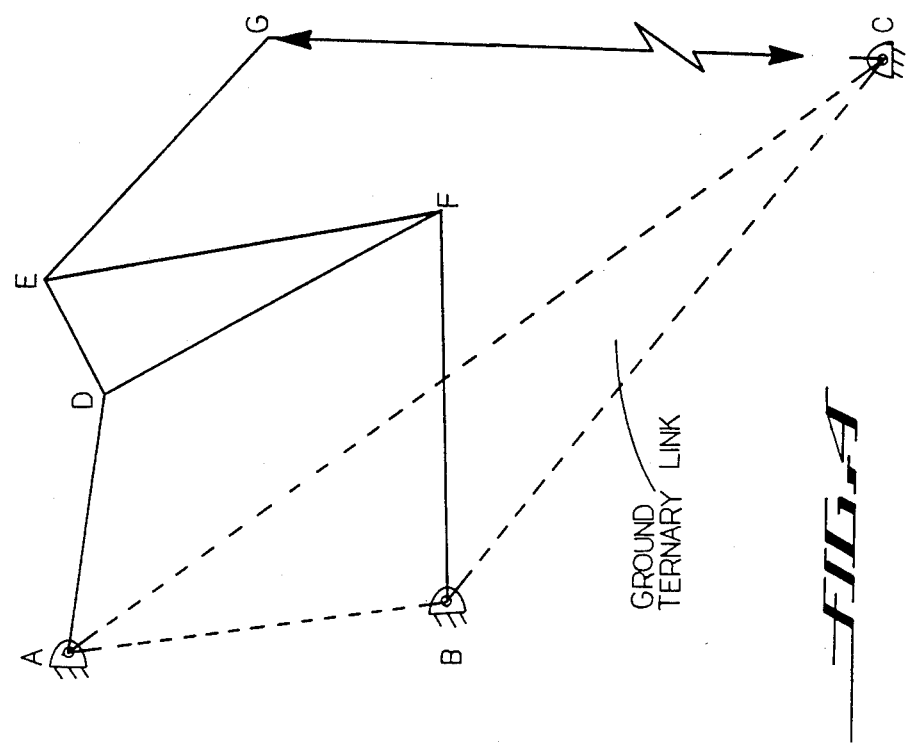
FIG. 4 is a kinematic chain of the overall mechanism with the links oriented as shown in the extended position of FIG. 3.
Figure 5:
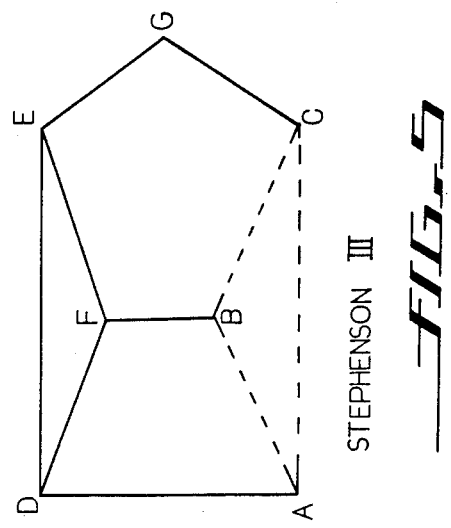
FIG. 5 is the kinematic chain of FIG. 4 with link lengths adjusted or equivalants substituted to more clearly show the standard class of linkage.

It should now be reasonably clear that links 48, 38, and 40 combine with a fixed link between pin points 44 and 49 to create a four-bar linkage. Since the free ternary link 38 of the four-bar linkage is pin connected at 39 to the flap support bracket 19, which in turn pin connects to the carriage assembly 24 at 50, the carriage assembly is free to translate on the track 29. This portion of the linkage combines with the four-bar linkage as shown in FIG. 4 where the track and carriage element is represented as a link of infinite length to produce the kinematic chain represented by FIG. 4. Identifying the pin points with the more familiar Arabic letters, pins A, B, and C are fixed to structure, or grounded, to produce the ground ternary link represented by the three dotted lines. The symbol α in the link C–G is there to indicate infinity which is a true representation of the track since it moves along a straight line. The free ternary line is represented by the pins D–E–F. Now, the kinematic chain of FIG. 4 can be adjusted to a more recognizable form by arbitrarily adjusting link lengths which produces the classic six-bar linkage of FIG. 5. Again, the dotted lines A–B, B–C, and A–C form the triangle A, B, C and represent the ground ternary link while the solid lines D–E, E–F, and D–F represent the free ternary link and should now be readily recognized as a Stephenson III type six-bar linkage.

What has been produced by combining the pivotally supported main flap on a carriage running on a track in combination with a four-bar linkage to combine and form a six-bar linkage, is the most efficient flap mechanism for this certain wing-flap combination, and avoids the flexure problems in the all-linkage system and the complexity of the two-track systems of the prior art, as depicted in this invention.

What is claimed is:

1. An extending and retracting mechanism for a trailing edge flap system attached to an aircraft wing, said wing having fixed structure, comprising:

track means mounted on said fixed structure of said wing;

carriage means engaging said track means for sliding movement on said track;

at least a main flap segment pivotally attached to said carriage means;

a four-bar linkage, having four pin connected links, with a first link grounded to structure and a second link opposite said first link, pin connected to said flap so as to make said second link a free ternary link and said four-bar linkage combines with said track and carriage to form a six-bar linkage of the Stephenson III type; and drive means for rotating one link of said four-bar linkage so that said carriage moves on said track translating said flap while rotating said flap about said pivotal connection to said carriage means.

2. The flap drive mechanism of claim 1 wherein said drive means comprises:

a rotary drive having a rotating output shaft, said rotary drive being attached to said fixed structure so said output shaft is one of said pins connecting said grounded link into said four-bar linkage; and a drive link which is one of the links of said four-bar linkage, said drive link being fixedly attached to said rotating output shaft of said rotary drive so as to drive said flap drive mechanism.

3. The flap drive mechanism of claim 2 wherein said track means is a straight track.

4. The flap drive mechanism of claim 3 wherein said pivotal connection between said carriage means and said flap is a spherical bearing with its main axis of rotation oriented generally perpendicular to the chord of said wing.

5. The flap drive mechanism of claim 4 wherein said pivotal connection between said carriage means and said flap further comprises a connecting link between said spherical bearing and said flap with a hinged connection at said flap oriented 90° to said main axis of said spherical bearing.

6. A mechanism for extending and retracting an aircraft wing trailing edge flap from and to a nested position adjacent fixed structure at the trailing end of the wing comprising:

a rotary drive having a rotating output shaft, attached to said fixed structure;

a drive link fixedly attached to said rotating output shaft;

a second link pivotally attached to said drive link at a point spaced from said output shaft connection;

a third link pivotally connected to said second link at a point on said second link spaced from said drive link connection and pivotally connected at a second point to said fixed structure so as to form an imaginary fourth link with said rotating shaft, said fourth link being grounded, to complete a four-bar linkage;

a flap pivotally connected to said second link so as to make said second link a free ternary link;

a carriage pivotally attached to said flap at a point remote from said pivotal connection of said flap to said second link; and a track mounted on said fixed structure and adapted to slideably engage said carriage so that the combination of the four-bar linkage with the carriage and track and their pivotal attachments to the flap produce a six-bar linkage of the Stephenson III type.

* * * * *